United States Patent [19]

Orth, Jr.

[11] 4,206,236
[45] Jun. 3, 1980

[54] METHOD OF PRESERVING WASTE PROTEINACEOUS ANIMAL FOOD MATERIALS FOR USE AS BAIT FOR CRUSTACEANS

[76] Inventor: George D. Orth, Jr., 10610 Riviera Pl. NE., Seattle, Wash. 98125

[21] Appl. No.: 885,626

[22] Filed: Mar. 13, 1978

[51] Int. Cl.² ............................................. A23K 1/10
[52] U.S. Cl. ..................................... 426/1; 426/332; 426/574; 426/646; 426/423; 426/805; 43/4.5
[58] Field of Search ................ 426/1, 321.2, 330, 331, 426/332, 532, 574, 641, 643, 647, 423, 805, 646

[56] References Cited

U.S. PATENT DOCUMENTS

| | | | |
|---|---|---|---|
| 1,608,688 | 11/1926 | Williamson | 426/1 |
| 3,482,985 | 12/1969 | Burgess | 426/331 X |
| 3,623,884 | 11/1971 | Haas | 426/335 X |
| 3,730,728 | 5/1973 | Patashnik et al. | 426/1 |
| 3,846,557 | 11/1974 | Mulla et al. | 426/1 |
| 3,873,736 | 3/1975 | Palmer et al. | 426/332 X |
| 3,876,803 | 4/1975 | Stephan et al. | 426/1 |
| 3,901,976 | 8/1975 | Roth et al. | 426/423 X |
| 4,001,445 | 1/1977 | Horrocks et al. | 426/332 X |

Primary Examiner—Robert A. Yoncoskie
Attorney, Agent, or Firm—Seed, Berry, Vernon & Baynham

[57] ABSTRACT

A method is disclosed for preserving proteinaceous animal food materials useful as bait for fish and crustaceans, such as crab. The animal food material is comminuted together to a finely divided state of the consistency of a thick soup with at least 4% by weight, based on the weight of the animal food material, of a polyol having from 2 to 8 carbon atoms and 2 to 6 hydroxyl groups. Edible polyols are used when the end product is to be used as a bait or foot supplement. Anti-oxidants and/or mold inhibitors are also preferably added to the animal food material/polyol mixture. The mixture is further stabilized against decay for extended periods of time when stored at ambient temperatures by incorporating into the mixture a sufficient amount of attapulgus clay to dehydrate the animal food material/polyol mixture. The resulting mixture may be extruded into a shaped form for use as a crab bait or used in granular form.

7 Claims, No Drawings

METHOD OF PRESERVING WASTE PROTEINACEOUS ANIMAL FOOD MATERIALS FOR USE AS BAIT FOR CRUSTACEANS

BACKGROUND OF THE INVENTION

1. Field of the Invention

This invention relates to a method of preserving waste proteinaceous animal food materials and keeping them stabilized against decomposition and decay for extended periods of time when stored at room temperature.

2. Description of the Prior Art

Fish wastes, i.e. cannery wastes, have traditionally been disposed of by direct discharge into the nearest water body. New laws and regulations now prohibit this; however, canneries are currently allowed to collect their fish wastes, chop them and dispose of them by dumping into the ocean at required distances from shore. This is a costly disposal method and not entirely satisfactory. For one thing, the fish wastes cannot be stored for any length of time because of their rapid decay which causes terrific odor problems, requiring land burial for disposal which is even more costly than disposal in the ocean. There remains a need for a convenient way to utilize fish wastes for a useful purpose which, at the same time, will solve the waste disposal problem associated therewith.

Glycols are known to inhibit decay in proteinaceous materials such as fish wastes. U.S. Pat. No. 2,693,417 describes the use of glycol to preserve fish bait and herring. U.S. Pat. No. 3,904,774 discloses treating food and fish filets with edible glycols to dehydrate and preserve the food and/or fish filets. Before cooking, the glycol is washed from the treated food.

SUMMARY OF THE INVENTION

It is a primary object of this invention to provide a method of preserving waste proteinaceous animal food materials.

It is a further object of this invention to provide a method of preserving and retaining waste proteinaceous animal food materials stable against decay and decomposition for extended periods of time when stored at an ambient temperature.

It is a further object of this invention to provide a method of making a liquid fertilizer composition or pelletized fertilizer compound from proteinaceous animal food materials.

It is a further object of this invention to provide a method of making a shaped bait for crustaceans from waste proteinaceous animal food materials.

These and other objects are accomplished by comminuting the animal food material together with at least 4% by weight, based on the weight of the animal food material, of a polyol. The food material is comminuted to a particle size generally no greater than 0.05 inches to form a thick soupy material which can be used as is, as a fertilizer or as an animal food supplement. Anti-oxidants and or mold inhibitors may be added to the animal food material/polyol mixture. To further stabilize the animal food material against decay and odor when stored at ambient temperatures for substantial periods of time, the animal food material/polyol mixture may be blended with a sufficient amount of attapulgus clay to dehydrate the animal food material/polyol mixture. The resulting mixture, a stiff putty-like material, may be extruded into a shaped form and placed in crab traps or used to bait fish hooks. The material slowly disperses due to action of ocean currents on the material, thus attracting fish to the fish hook or crabs to the crab traps.

DETAILED DESCRIPTION OF THE PREFERRED EMBODIMENTS

Proteinaceous animal food materials as used herein means fish wastes such as the wastes of crustaceans, bivalves and finned fish, including shrimp, crabs, lobster, clams and oysters; blood wastes, and meat wastes from the flesh of fish, cattle, swine, sheep, goats, poultry, horses and other mammals.

By the method of the present invention the animal food material is blended with at least 4% by weight, based on the weight of the animal food material, of a polyol having from 2 to 6 carbon atoms and 2 to 6 hydroxyl groups together with anti-oxidants and/or mold inhibitors. The mixture is then run through a grinder which comminutes the mixture to a particle size of no greater than 0.05 inches. The resulting mixture has a consistency of a thick soup. The material may be used as is as a liquid fertilizer or processed with fillers or other chemicals to make a stable, marketable product for commercial or home use.

The polyols which can be used include non-edible glycols such as ethylene glycol and diethylene glycol, and edible glycols such as triethylene glycol, tetra-ethylene glycol, propylene glycol, dipropylene glycol, mixtures thereof or polyols such as glucose, sucrose, sorbitol, mannitol, etc.

Anti-oxidants which may be added include the conventional anti-oxidants added to food materials such as a BHT (butylated hydroxytoluene). Mold inhibitors, such as the methyl, ethyl, propyl and butyl esters of para-hydroxybenzoic acid esters may also be added. Alternatively, the animal food material may be ground to finely divided form separately and then blended with the polyol. When the mixture is to be used as a food supplement or bait the polyol blended is an edible polyol. A preferred edible polyol is propylene glycol which is added to the animal food material in amounts of at least 4% to 30% by weight, based on the weight of the animal food material. Amounts less than about 4% by weight do not give sufficient preservative action of the animal food material.

The animal food material/polyol mixture described above can be further protected against decay and decomposition by blending the mixture with a sufficient amount of attapulgus clay to form either a flowable granular product or a putt-like mixture which can be extruded into a shape desired for use as a food or bait material. When extruded into a shape, the resulting shaped product is particularly useful as crab bait or fish bait.

Attapulgus clay also exerts a preservative action when blended in sufficient amounts with the animal food material having no polyol added thereto. Anti-oxidants and mold inhibitors must be added, however. A sufficient quantity of attapulgus clay to dehydrate the animal food material and inhibit decay should be used.

There are four main types of crab which are caught on the West coast of the United States, including (1) inland crab such as those caught along Puget Sound, (2) ocean crab such as those caught off coastal waters of the Pacific Ocean, (3) tanner crabs such as those caught in the Bering Sea and (4) Alaska King Crab such as caught in the Bering Sea. The flavor of each crab is dependant on the type of food it eats. Generally the food of crabs consists mainly of claims for inland and ocean crabs and fish and clams for Bering Sea crabs.

Many types of bait have been used to attract crabs to crab traps, generally fresh fish. Fresh fish, however, when placed in a crab trap, after less than 48 hours, sours and ceases to attract crabs. Because of weather conditions, crab traps may have to be in the water for several days. If the bait has decayed and decomposed it no longer serves its function after a period of less than two days. This is a distinct disadvantage to the crabbing industry. What has been needed is a bait which is internally stable and will release an odor slowly to attract crabs to the crab pot and which will last longer and will not decompose or decay within a period of at least a week or more.

One way which the fishing industry has attempted to alleviate the decay and decomposition of crab bait is to use frozen bait; however, frozen bait is even more subject to decay and decomposition than is fresh bait. One of the most commonly used frozen baits is herring which can only be caught at certain times of the year out of coordination with the opening of the crab season.

By blending the animal food material/polyol mixture with a sufficient amount of attapulgus clay to produce a putty-like material which is extrudable into shaped forms, a crab or fish bait is produced which is stable at ambient temperatures out of the water for at least six months and stable indefinitely under cold storage. The shaped product keeps the odor of fresh fish or fresh clams, whichever material is used as the proteinaceous animal food material in the bait. Attapulgus clay has the property of adsorbing the animal food material/polyol mixture and forming a stiff putty-like mixture which is extrudible into a soft shaped pellet. The pellets retain their shape when pressed and do not stick together. Preferred attapulgus clays include those commercially sold under the tradenames "Attagel-40", "Attagel-50" and "Attagel-350" by Englehard Minerals and Chemicals Corporation. The proteinaceous animal food material/polyol mixture, when blended with sufficient attapulgus clay to produce a consistency of material which is extrudible, can be extruded by conventional means into any desired shape. For crab bait, soft pellets have been used which are placed in the bait box of crab traps. The pelletized form of the bait is easily packaged and stored in crab boats, particularly those which do not have cold storage facilities on board. Attapulgus clay offers greater absorption and enables the desired plasticity and adhesiveness of the final product to be obtained. Other clays, such as bentonite and kaolin clay, do not have the properties of attapulgus clay.

When a crab trap incorporating the pelletized product described is lowered into the water, the mild ocean currents contacting the bait slowly disperses the attapulgus clay and its adsorbed proteinaceous animal food material/polyol mixture into the surrounding water. This fresh odor of the bait dispersed by the sea currents attracts crabs readily. To vary the rate of dissolution of the pellets, the amount of attapulgus clay used is varied. Generally the amount of clay used ranges from 10 to 40% by weight, based on the weight of the animal food material/polyol mixture. An increase in clay content in the mixture decreases the period of dissolution of the pellets. Conversely a decrease in the amount of clay used increases the rate of dissolution of the pellets.

If desired, additional amounts of attapulgus clay over that necessary to produce an extrudable mixture can be added to the animal food material/polyol mixture to produce a flowable granular material which is stable against decomposition and decay for extended periods of time, i.e. as much as six months or more.

The following examples are illustrative of the methods described herein but are not intended to be limiting.

EXAMPLE 1

Whole fresh or frozen herring was ground through a food grinder and then through a Moorehouse paint mill to a particle size of less than 0.05 inches together with 12% by weight propylene glycol, based on the weight of the herring. 0.01 wt.% butylated hydroxytoluene was added as an anti-oxidant. The resulting animal food material/propylene glycol mixture had the consistency of a thick soup with the particle size of the wastes no larger than about 0.05 inches depending on the setting of the mill. The soupy liquid was mixed with 30% by weight, based on the weight of the food material/propylene glycol mixture, of Attagel-50 and was extruded through a food grinder, having a 3/16" hole size in the plate to produce cylindrical pellets 3/16 inch in diameter and ¼ to ½ inch long. About one-half pound of the pellets were placed in the bait boxes of a series of crab traps which were lowered into the Bering Sea off the coast of Alaska. The bait was extremely successful for King Crab.

A further bait was made in the same way as described above except using as the animal food material mixture of 50% herring paste and 20% blood solution. This product was used for attracting Dungeness and tanner crabs with good trap returns even after the traps were left in the water for over four days.

EXAMPLE 2

Clams and squid were comminuted in a like manner as in Example 1 with propylene glycol and then treated with Attagel-50 to make a pellet which was used in crab traps in the inland waters of Puget Sound for attracting Dungeness crabs. Good results were obtained.

EXAMPLE 3

Salmon eggs were ground in a like manner as described with regard to Example 1 and blended with 15% by weight propylene glycol and then further blended with 35%–40% Attagel-50 and, if desired, a dye to give a salmon egg color. 0.01% BHT was added to stabilize the oils contained in the salmon eggs. The mixture was extruded into pellets of the same type as described with regard to Example 1. These pellets were found to be excellent crab bait for Dungeness crab. Unexpectedly, the pellets also served as a bait for fish. The dispersion characteristics of the attapulgus clay making up the pellet, when in the water, coupled with the natural fish characteristics of salmon eggs, made the pellets an excellent attractant for fish. The pellets could be used as bait for fish, if desired, by placing them on a fish hook.

I claim:

1. A method of making a bait for marine animals which is stable against decay and decomposition at ambient temperatures and stable against decay and decomposition in the water for extended periods of time, comprising:
   comminuting proteinaceous material selected from the group consisting of animal and fish waste to a particle size of not greater than 0.05 inch, blending a polyol having from 2 to 8 carbon atoms and 2 to 6 hydroxyl groups which acts as a preservative for the animal food material intimately with the food material, the polyol constituting 4% to 30% by weight, based on the weight of the food material, intimately admixing with the food material/polyol mixture about 10% to 40% by weight, based on the weight of the food material/polyol mixture, of attapulgus clay, and extruding the mixture to form a shaped bait.

2. The method according to claim 1 wherein the polyol is one selected from the group consisting of sucrose, glucose, sorbitol, mannitol and mixtures thereof.

3. The method according to claim 1 wherein the polyol is an edible glycol selected from the group consisting of propylene glycol, triethylene glycol, tetraethylene glycol, dipropylene glycol and mixtures thereof.

4. The method of claim 1 wherein the polyol is propylene glycol.

5. The method of claim 1 including placing the extruded shaped bait in a crab trap and placing the crab trap in water where crabs are found, the current of the water contacting and slowly dispersing the clay particles making up the shaped bait along with the odor of the food material making up the bait to attract crabs to the crab trap.

6. A method of attracting marine animals comprising:
placing a shaped bait material in the water as a bait material, the bait material produced by comminuting proteinaceous material selected from the group consisting of animal and fish waste to a particle size of not greater than 0.05 inches, blending a polyol having from 2 to 8 carbon atoms and 2 to 6 hydroxyl groups intimately with the animal food material, the polyol acting as a preservative and constituting from 4% to 30% by weight, based on the weight of the animal food material, intimately admixing with the animal food material/polyol mixture about 10% to 40% by weight, based on the weight of the animal food material/polyol mixture, of attapulgus clay, and extruding the mixture of animal food material/polyol/attapulgus clay to form a shaped bait, the current of the water contacting and slowly dispersing the attapulgus clay and its adsorbed animal food material into the surrounding water to attract marine animals.

7. The method of claim 6 wherein the marine animal is a crustacean.

* * * * *